(12) United States Patent
Hsia

(10) Patent No.: US 8,503,890 B2
(45) Date of Patent: Aug. 6, 2013

(54) SIGNAL PROCESSING DEVICE AND METHOD, AND INFRARED MULTI-CHANNEL RECEIVER

(75) Inventor: Ko-Yu Hsia, Hsinchu County (TW)

(73) Assignee: RFlife Technology Inc., Hsinchu (TW)

( * ) Notice: Subject to any disclaimer, the term of this patent is extended or adjusted under 35 U.S.C. 154(b) by 334 days.

(21) Appl. No.: 12/884,200

(22) Filed: Sep. 17, 2010

(65) Prior Publication Data

US 2011/0280571 A1    Nov. 17, 2011

(30) Foreign Application Priority Data

May 13, 2010  (TW) ............................ 99115322 A

(51) Int. Cl.
*H04B 10/06*   (2011.01)
*H04B 10/00*   (2013.01)
*H04B 10/69*   (2013.01)

(52) U.S. Cl.
CPC ................... *H04B 10/695* (2013.01)
USPC ......................... 398/202; 398/163; 398/208

(58) Field of Classification Search
USPC ................ 398/154, 163, 202–204, 208–211
See application file for complete search history.

(56) References Cited

U.S. PATENT DOCUMENTS

| | | | | |
|---|---|---|---|---|
| 3,970,795 | A | * | 7/1976 | Allen ............................ 370/252 |
| 5,790,587 | A |   | 8/1998 | Smith et al. |
| 6,075,820 | A | * | 6/2000 | Comino et al. ............... 375/245 |
| 7,324,036 | B2 | * | 1/2008 | Petre et al. .................... 341/155 |
| 7,676,244 | B2 |   | 3/2010 | Park et al. |

* cited by examiner

*Primary Examiner* — Dalzid Singh
(74) *Attorney, Agent, or Firm* — CKC & Partners Co., Ltd.

(57) ABSTRACT

A signal processing device includes an amplifier, a filter module, a demodulation module and a band control module. When the band control module controls the filter module to output a specific single-channel signal, the resonator of the demodulator is switched to resonate the selected single-channel signal. Then the selected single-channel signal is demodulated. A signal processing method and an infrared multi-channel receiver are also described herein.

13 Claims, 6 Drawing Sheets

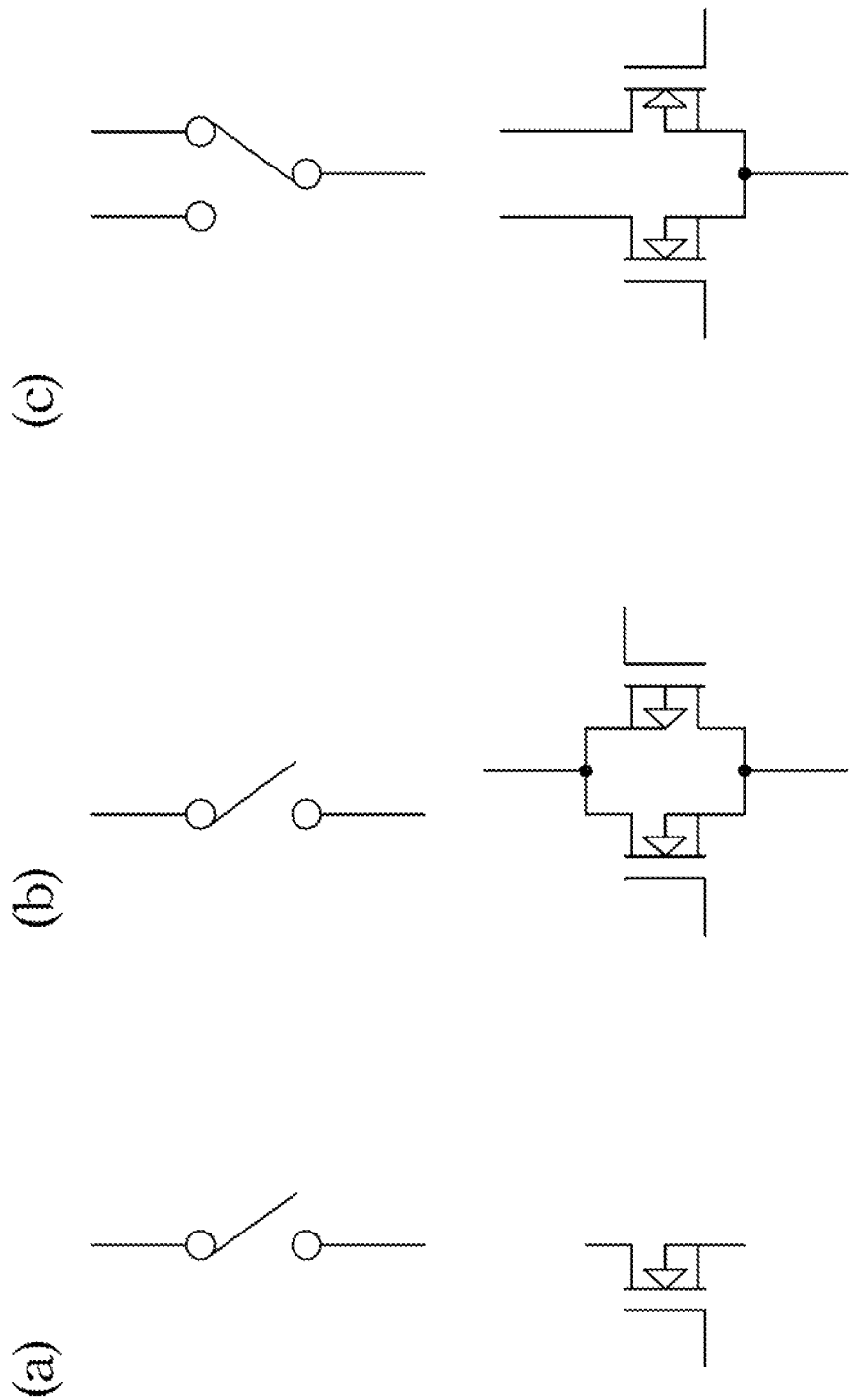

SIGNAL PROCESSING DEVICE AND METHOD, AND INFRARED MULTI-CHANNEL RECEIVER

RELATED APPLICATIONS

This application claims priority to Taiwan Application Serial Number 99115322, filed May 13, 2010, which is herein incorporated by reference.

BACKGROUND

1. Field of Invention

The present invention relates to a signal receiving/processing device and method. More particularly, the present invention relates to an infrared multi-channel receiver and method.

2. Description of Related Art

Since humans start to use electrical signal, the variety of processing method makes progress constantly. No matter the frequency of the usage or the range of the application of the electrical signal is broadening.

In general, the signal transmission technology uses the way to transmit the information by the carrier wave. Hence, after the receiver receives the signal, the received signal must be demodulate to obtain the information which the receiver wants to retrieve.

The common non-up/down conversion receiver receives a signal and amplifies the signal by an amplifier. Then, the band pass filter filters out the unwanted frequency to obtain the single channel signal which includes the information. Then, the single channel signal is resonated by the resonator and demodulated to obtain the information which we want to retrieve.

However, the signal remained after filtered by the band pass filter is a single signal, the resonance frequency of the resonator must be designed or tuned to match the frequency of band pass filter to resonate the signal. Therefore, the common non-up/down conversion receiver is designed for single frequency signal. When multi-channel signal is needed to be processed, more than one receivers are required to match different channels. It is high cost and inconvenient.

Hence, how to solve the problem described above, and provide a new solution is an important subject.

SUMMARY

In accordance with the foregoing and other objectives of the present invention, a signal processing device thereof is provided. The signal processing device comprises a filter module, a demodulation module and a band control module. The filter module is capable of receiving a multi-channel signal, and comprises a plurality of band pass filters and a first selector. The band pass filter is capable of filtering the multi-channel signal, and outputting single channel signal respectively. The first selector selectively couples to one of the band pass filter to output the selected single channel signal. The demodulation module couples to the band pass filters for demodulating the selected single channel signal and outputting a demodulated signal.

The demodulation module comprises a demodulator, a plurality of resonator and a second selector. The resonators correspond to the band pass filters respectively. The second selector is configured between the demodulator and the resonators and capable of switching the connection of the demodulator and the resonators. The band control module couples to the first selector for controlling the coupling of the first selector and the band pass filters. Moreover, the band control module also couples to the second selector for controlling the second selector to switch the connection of the demodulator and the resonators correspondingly.

Wherein, when the band control module controls the first selector to couple the specific band pass filter, the band control module also controls the second selector to couple the specific resonator corresponding to the specific band pass filter with the demodulator.

A signal processing method comprising a plurality of steps is also provided. First, a plurality of band pass filters filter a multi-channel signal and output a plurality of single channel signals correspondingly. Then a first selector outputs a selected single channel signal selected from the plurality of single channel signals. Accordingly, the second selector selects a corresponding resonator from a plurality of resonators to resonate the selected single channel signal. Finally, the resonated single channel signal is demodulated to a demodulated signal.

An infrared multi-channel receiver is provided. It comprises an optical sensor, a filter module, a limiting amplifier, a demodulation module, and a band control module.

The optical sensor is capable of transducing an infrared multi-channel signal to an electrical multi-channel signal. The filter module couples to the optical sensor, and comprises at least two band pass filters and a first selector. The band pass filters couple to the optical sensor respectively, and are capable of filtering the multi-channel signal and output a plurality of single channel signals correspondingly. A first selector is selectively coupled to one of the band pass filter, and is capable of outputting the selected single channel signal.

The limiting amplifier couples to the filter module, and is capable of amplifying the amplitude of the selected single channel signal and generating a received signal strength indicator signal. The demodulation module couples to the limiting amplifier, and is capable of demodulating the amplified selected single channel signal and outputting a demodulated signal. The demodulation to module comprises a demodulator, at least two resonators, and a second selector. The resonators correspond to the band pass filters respectively. The second selector is configured between the demodulator and the resonators, and is capable of selecting one of the resonators to couple to the demodulator. The band control module couples to the first selector and the second selector, and is capable of switching the coupling of the first selector and the band pass filters, and controlling the second selector to select the connection of the demodulator and the resonators correspondingly. Wherein, when the band control module controls the first selector to couple the specific band pass filter, the band control module also controls the second selector to connect the specific resonator corresponding to the specific band pass filter and the demodulator.

According to the foregoing description, the embodiments of the invention configure a plurality of band pass filters and resonators respectively. The first selector is used to select one single channel signal filtered by the band pass filter. The second selector is used to couple the corresponding resonator with the demodulator, so that the selected single channel signal can be demodulated. Therefore, the receiver can receive a multi-channel signal and select the specific single channel signal from the multi-channel signal for demodulating.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows:

FIG. 6 is a schematic diagram of circuits of the selector.

DETAILED DESCRIPTION

Figure 1:
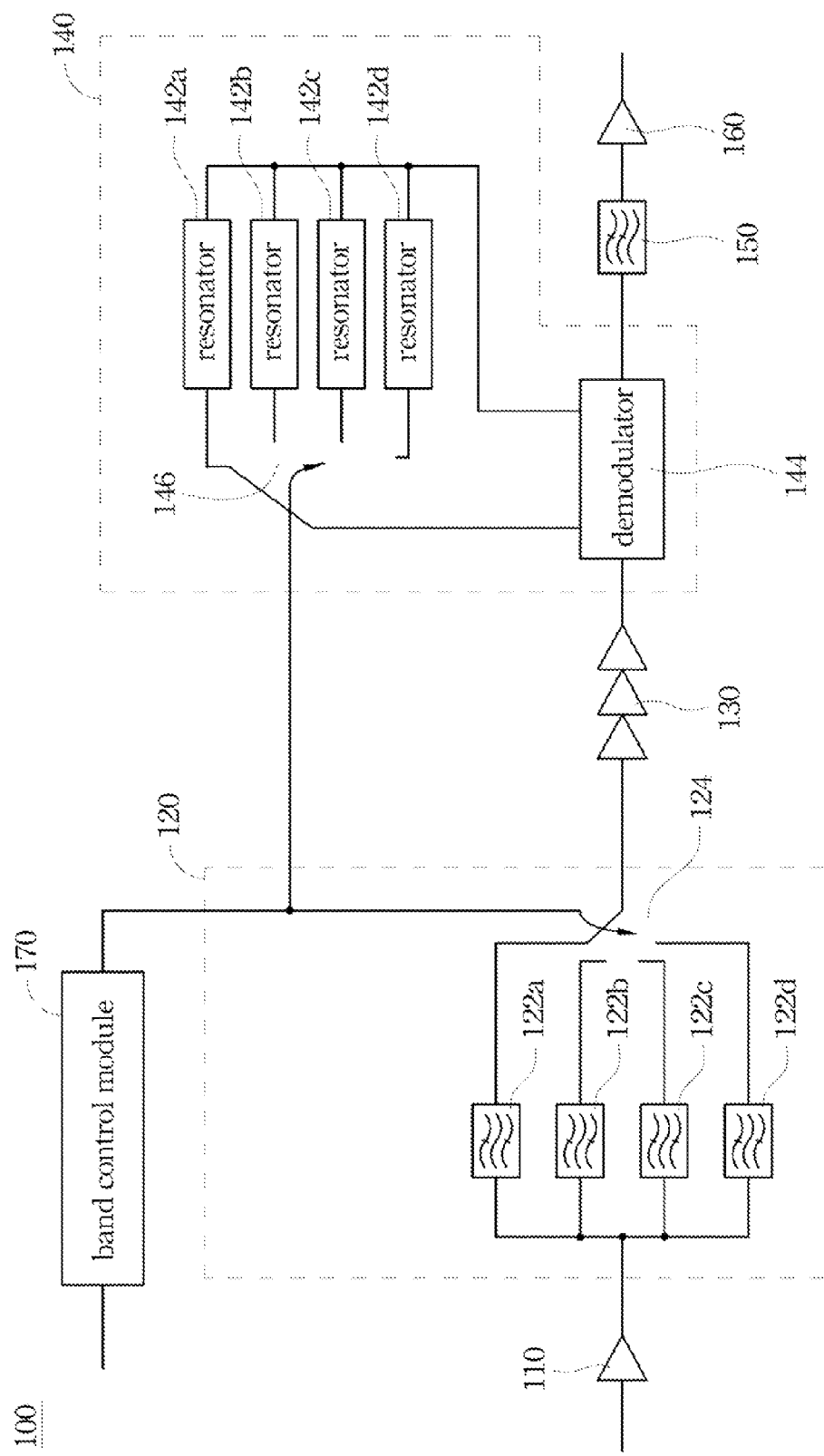
FIG. 1 is a schematic diagram of a circuit of the embodiment of the present invention.

Reference will now be made in detail to the present embodiments of the invention, examples of which are illustrated in the accompanying drawings. Wherever possible, the same reference numbers are used in the drawings and the description to refer to the same or like parts.

One feature of the invention is to add a plurality of band pass filters and corresponding resonators in a signal processing device (for example, a non-up/down conversion receiver). A first selector is also added to select the designated single channel signal filtered by the band pass filter. A second selector is also added to couple the corresponding resonator with the demodulator. The selected single channel signal is demodulated by the corresponding resonator and the demodulator, so that the signal processing device can receive a multi-channel signal and process the selected single channel signal. The signal processing device can then output the demodulated single channel signal.

First Embodiment

Please refer to FIG. 1. FIG. 1 is a schematic diagram of a circuit of a signal processing device of the embodiment. The signal processing device 100 comprises an amplifier 110, a filter module 120, demodulation module 140 and a band control module 170.

The signal processing device 100 receives a multi-channel signal, and amplifies the signal by the amplifier 110. The filter module 120 is coupled to the amplifier 110 for filtering the amplified multi-channel signal. The filter module 120 comprises at least two band pass filters (for example, band pass filters 122a, 122b, 122c, 122d) and a first selector 124. The band pass filters 122a, 122b, 122c, 122d are coupled to the amplifier 110 for filtering the amplified multi-channel signal and outputting respectively single channel signals. The first selector 124 selectively couples to one of the band pass filters 122a, 122b, 122c, 122d to output the selected single channel signal.

The demodulation module 140 couples to the filter module 120 for demodulating the selected single channel signal outputted by filter module 120 and outputting a demodulated signal. The demodulation module 140 has a demodulator 144, at least two resonators (for examples, 142a, 142b, 142c, 142d) and a second selector 146. The resonance frequency of the resonators 142a, 142b, 142c, 142d correspond to the band pass filters 122a, 122b, 122c, 122d. The second selector 146 is configured between the demodulator 144 and to the resonators 142a, 142b, 142c, 142d for coupling one of the resonators 142a, 142b, 142c, 142d with the demodulator 144.

The band control module 170 is coupled to the first selector 124 and the second selector 146 for controlling the coupling of the first selector 124 and the band pass filters 122a, 122b, 122c, 122d, and controlling the second selector 146 to couple the demodulator 144 with the corresponding resonators 142a, 142b, 142c, 142d.

When the band control module 170 controls the first selector 124 to couple the specific band pass filter, the band control module 170 also controls the second selector 146 to couple the specific resonator corresponding to the specific band pass filter with the demodulator 144. As a result, the specific resonator and the demodulator 144 can demodulate and output the demodulated signal correctly.

For example assuming that the frequency of the single channel signal filtered by the band pass filter 122a corresponds to the resonance frequency of the resonator 142a. When the band control module 170 controls the first selector 124 to couple the band pass filter 122a, the band control module 170 also controls the second selector 140 to couple the corresponding resonator 142a with the demodulator 144. Therefore, the single channel signal filtered by the band pass filter 122a can be demodulated by the resonator 142a and the demodulator 144.

Moreover, the embodiment further comprises a limiting amplifier 130, a low pass filter 150 and a baseband amplifier 160. The limiting amplifier 130 is configured between the filter module 120 and the demodulation module 140 for amplifying the amplitude of the selected single channel signal. The low pass filter 150 is coupled to the demodulation module 140 for filtering out the high frequency noise of the demodulated signal and providing the equalization function. The baseband amplifier 160 is coupled to the low pass filter 150 for amplifying the demodulated signal.

Figure 2:
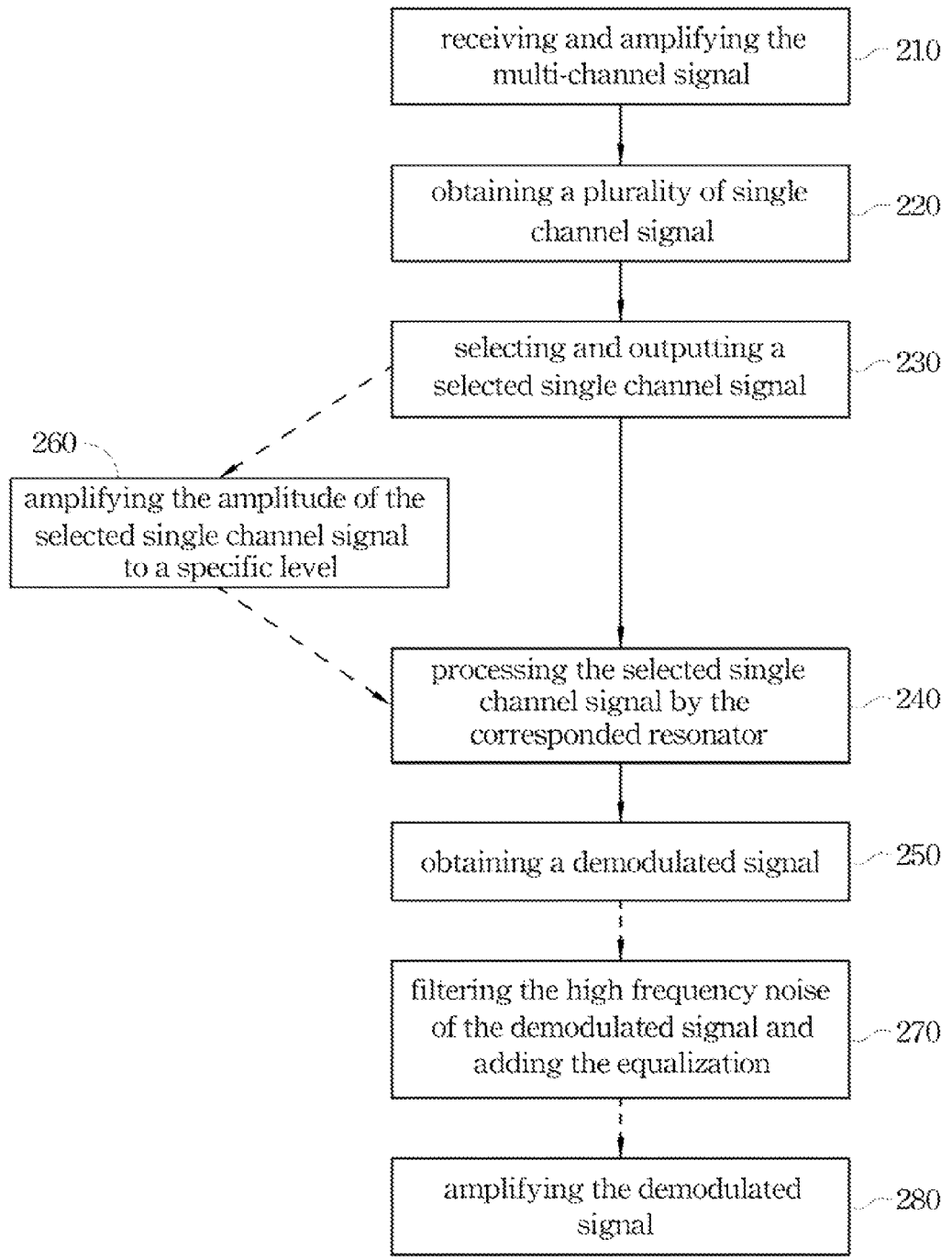
FIG. 2 is a schematic diagram of a signal processing method flow chart of the embodiment of the present invention.

To further describe the processing method of the embodiment, please refer to the FIG. 1 and FIG. 2 together. FIG. 2 is a schematic diagram of a signal processing method flow chart of the embodiment of the present invention. In step 210, the amplifier 110 receives the multi-channel signal and amplifies the multi-channel signal. Then, in the step 220, the multi-channel signal is filtered by the plurality of band pass filters (for example, band pass filters 122a~122d) and obtaining a plurality of single channel signals correspondingly. In step 230, the selected single channel signal selected from the plurality of single channel signals is outputted through the first selector 124. In step 240, the second selector 146 is controlled by the band control module 170 to select a specific resonator from the resonators (for example, resonators 142a~142d) correspondingly. In step 250, the selected single channel signal is demodulated to a demodulated signal.

Moreover, the method further comprises some sub-step. In step 260, the amplitude of the selected single channel signal is amplified to a specific level by the limiting amplifier. In step 270, the low pass filter 150 filters out the high frequency noise of the demodulated signal and provides the equalization function. In step 280, the demodulated signal filtered by the low pass filter 150 is amplified by a baseband amplifier 160.

Second Embodiment

To understand more about the invention, another embodiment is described herein. This embodiment is an infrared multi-channel receiver for receiving an infrared signal comprising multi-channel information. This embodiment is applied in a stereo sound demodulation system. Therefore, the stereo sound channel includes left sound channel and right sound channel. The circuits processing these two sound channels are almost the same therefore only circuits processing one sound channel will be discussed herein.

Figure 3:
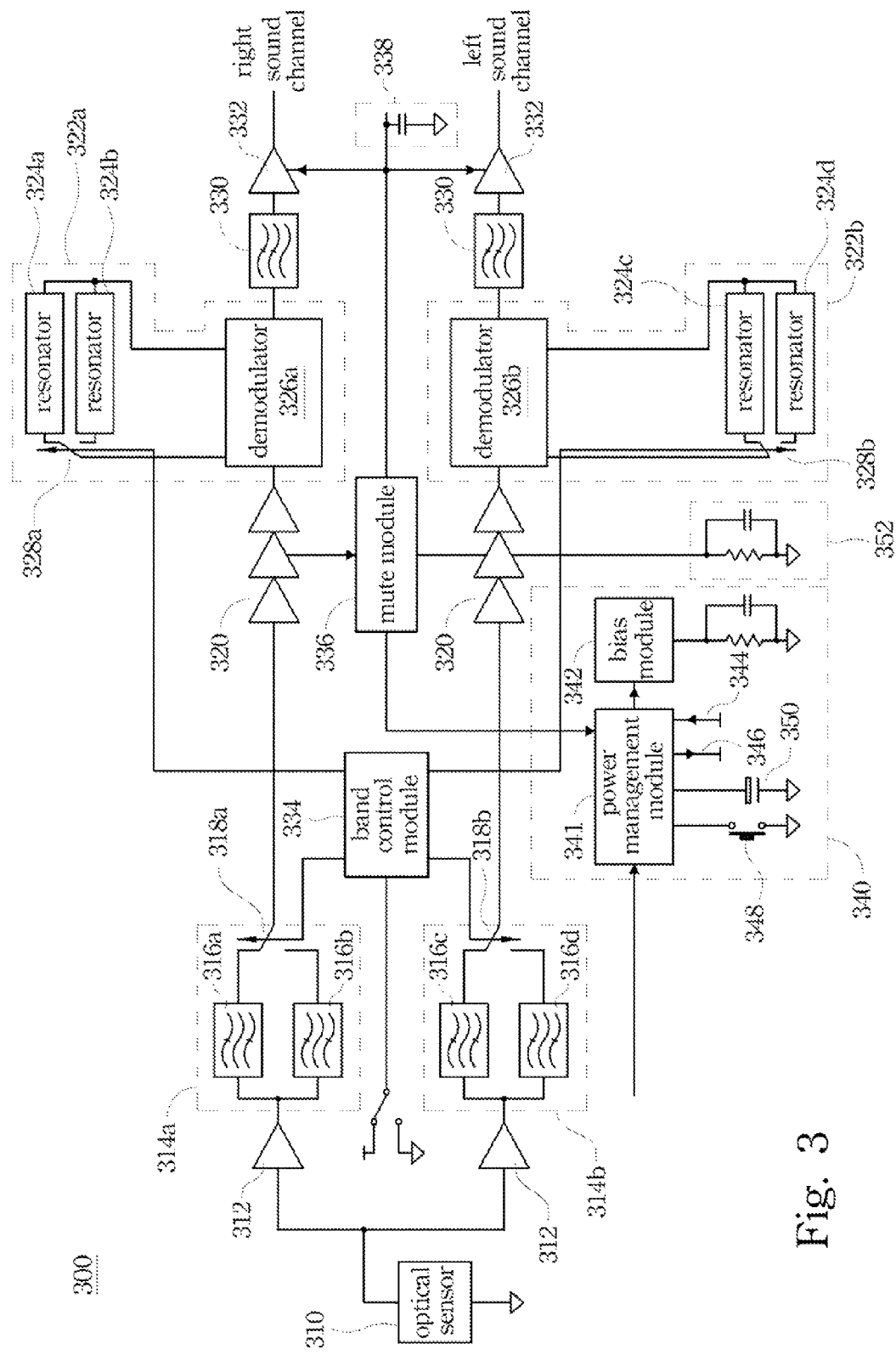
FIG. 3 is a schematic diagram of a circuit of another embodiment of the present invention.

Please refer to FIG. 3. FIG. 3 is a schematic diagram of a circuit of an embodiment of the present invention. The infrared multi-channel receiver 300 comprises at least an optical sensor 310, amplifiers 312, filter modules 314a, 314b, limiting amplifies 320, demodulation modules 322a, 322b, low pass filters 330, and baseband amplifiers 332.

The optical sensor is used for receiving an infrared signal, and transducing the infrared signal to an electrical signal. The amplifier 312 is coupled to the optical sensor 310, and used for amplifying the electrical signal.

The filter modules 314a, 314b are coupled to the amplifiers 312 separately. Each of filter modules 314a, 314b comprises at least two band pass filters (for example, band pass filter 316a, 316b, 316c, 316d) and first selectors 318a, 318b separately. Since the left and right sound channel corresponds to each other, in this embodiment, the band pass filters 316c, 316d configured in the left channel correspond to the band pass filters 316a, 316b. In other words, the band pass filter 316c corresponds to the band pass filter 316a, and the band pass filter 316d corresponds to the band pass filter 316b.

Moreover, the band pass filters 316a, 316b, 316c, 316d are coupled to the amplifiers 312, and used for filtering the multi-channel signal. The first selectors 318a, 318b are selectively coupled to one of the band pass filters 316a, 316b, 316c, 316d respectively, and used for outputting selected signals. In this embodiment, the first selector 318b and the band pass filter 316c, 316d are configured for processing the left sound channel therefore the first selector 318b is operated to selectively couple to one of the band pass filter 316c, 316d. The first selector 318a and the band pass filter 316a, 316b are configured for processing the right sound channel therefore the first selector 318a is operated to selectively couple to one of the band pass filter 316a, 316b. Moreover, when the first selector 318b configured in the left sound channel is coupled to the band pass filter 316c, the first selector 318a configured in the right sound channel is coupled, to the band pass filter 316a to conform a relation of signal corresponding.

The limiting amplifiers 320 are coupled to the filter modules 314a, 314b and used for amplifying the amplitude of the selected single channel signal and generating a received signal strength indicator (RSSI) signal.

The demodulation modules 322a, 322b are coupled to the limiting amplifiers 320 for demodulating the selected single channel signal and outputting a demodulated signal. The demodulation modules 322a, 322b comprise demodulator 326a, 326b, at least two resonators (for example 324a, 324b, 324c, 324d), and second selectors 328a, 328b separately. The resonators 324a, 324b, 324c, 324d correspond to the band pass filters 316a, 316b, 316c, 316d respectively. The selectors 328a, 328b are configured between the demodulators 326a, 326b and the resonators 324a, 324b, 324c, 324d for selectively coupling the resonators 324a, 324b, 324c, 324d with demodulators 326a, 326b.

In this embodiment, the second selector 328b, the resonators 324c, 324d and demodulators 326b are configured for processing the left sound channel. Therefore, the second selector 328b may select one of the resonators 324c, 324d to couple the demodulator 326b. The second selector 328a, the resonators 324a, 324b and demodulators 326a are configured for processing the right sound channel. Therefore, the second selector 328a may select one of the resonators 324a, 324b to couple the demodulator 326a.

Moreover, the resonators 324a, 324b, 324c, 324d correspond to the band pass filters 316a, 316b, 316c, 316d to ensure the normal operation of the receiver. In this embodiment, the resonator 324a corresponds to the band pass filter 316a. The resonator 324b corresponds to the band pass filter 316b. The resonator 324c corresponds to the band pass filter 316c. The resonator 324d corresponds to the band pass filter 316d. Hence, the circuits processing left sound channel comprises the resonators 324c, 324d, and the circuits processing right sound channel comprises the resonators 324a, 324b. The second selector 328a selects one of the resonators 324a, 324b to couple the demodulator 326a. The second selector 328b selects one of the resonators 324c, 324d to couple the demodulator 326b.

The low pass filters 330 are coupled to the demodulation modules 322a, 322b for filtering out the high frequency noise of the demodulated signal and providing the equalization function. The baseband amplifiers 332 are coupled to the low pass filters 330 for amplifying the demodulated signal.

The band control module 334 is coupled to the first selectors 318a, 318b, and second selectors 328a, 328b. The band control module 334 could control the first selector 318a to couple the band pass filters 316a or 316b, and control the first selector 318b to couple the band pass filters 316c or 316d. The band control module 334 could also control the second selector 328a to allow the demodulator 326a to couple with the resonators 324a or 324b in accordance with the coupling of the first selector 318a with the band pass filter 316a or 316b. The band control module 334 also could control the second selector 328b to allow the demodulator 326b to couple with the resonators 324c or 324d in accordance with the coupling of the first selector 318b with the band pass filter 316c or 316d.

When the band control module 334 controls the first selector 318a to couple one of the band pass filters 316a, 316b, and controls the first selector 318b to couple the one of the band pass filter 316c, 316b, the band control module 334 also controls the second selector 328a, 328b to couple the demodulators 326a, 326b with the corresponding band pass filters 324a, 324b, 324c, 324d. For example, when the band control module 334 controls the first selector 318b configured in left sound channel to couple to the band pass filter 316c and controls the first selector 318a configured in right sound channel to couple to the band pass filter 316a, the control module 334 also controls the second selector 328b configured in the left sound channel to couple the demodulator 326b with the resonator 324c corresponding to the band pass filter 316c and controls the second selector 328a configured in the right sound channel to couple the demodulator 326a with the resonator 324a corresponding to the band pass filter 316a. Therefore, the single channel signal filtered by the band pass filters 316a, 316c may be demodulated by resonators 324a, 324c and the corresponding demodulators 326a, 326b.

Moreover, the infrared multi-channel receiver 300 further comprises a mute module 336, a mute control module 338 and a power management block 340. The mute module 336, is coupled to the limiting amplifiers 320 respectively, and used for comparing the RSSI signal with a threshold level. When the RSSI signal is lower than the threshold level, it means the strength of the received signal at limiting amplifiers 320 is too weak. So the mute module 336 turns off the bias of the baseband amplifier 332 therefore turns off the baseband amplifier 332 and sends out a turn off signal. The limiting amplifier 320 is further coupled to the RSSI adjustment unit 352 which is used for adjusting the level of the RSSI signal. The RSSI adjustment unit 352 can increase or decrease the strength of the RSSI signal from limiting amplifiers 320 therefore change the condition to turn off the baseband amplifier 332 since the threshold level is set fixed. The adjustment by RSSI adjustment unit 352 is an easier way to change the condition for turning off the baseband amplifier 332 than to adjust the threshold level to do so.

The mute control module 338 is coupled to the mute module 336 and the baseband amplifiers 332, and used for controlling the turning off slope when the bias of the baseband amplifier 332 is turned off by the mute module 336. With proper design, the mute control module 338 can control the mute module 336 to turn off baseband amplifier 332 with a smooth turning off slope to avoid noise due to steep powering down slope. In this embodiment, the mute control module 338 is designed by a capacitor to control the turning off slope of the bias of the baseband amplifier 332 to mute the sound smoothly. In other embodiment, the mute control module 338 could be designed with other circuit to accomplish the same function.

The power management block 340 is coupled to the mute module 336. The power management block 340 comprises a power management module 341, a bias module 342, an input control point 344, an output control point 346, a power switch 348 and a time control module 350. The bias module 342 is coupled to the power management module 341, and used for providing biases to other blocks for driving the infrared multi-channel receiver 300. The input control point 344 is coupled to the power management module 341, and used for starting up the power management module 341. For example, the power management module 341 can be turned on to work when the input control point 344 receives a high voltage signal. The output control point 346 is coupled to the power management module 341, and used for outputting a power management signal. For example, the power management module 341 will outputs a high voltage signal to the output control point 346 when the bias module 342 is turned on. When the bias module 342 is turned off, the power management module 341 outputs a low voltage signal to the output control point 346. With the signals from output control point 346, the infrared multi-channel receiver 300 could control external circuit and provide more applications.

The power switch 348 is coupled to the power management module 341 and used for sending a first trigger signal to the power management module 341 to turn on or turn off the bias module 342. For example, when the power switch 348 is triggered, then the first trigger signal is sent to the power management module 341 to turn on the bias module 342. When the power switch 348 is triggered again, then another trigger signal is sent to the power management module 341 to turn off the bias module 342. The time control module 350 is coupled to the power management module 341. When the power management module 341 receives the turn off signal sent from the mute module 336, the time control module 350 sends a second trigger signal after a period of time to control the power management module 341 to turn off the bias module 342. In this embodiment, the time control module 350 uses a capacitor to adjust the time period. In other embodiment, the time control module 350 could be designed with other circuits to accomplish the same function.

Figure 4:
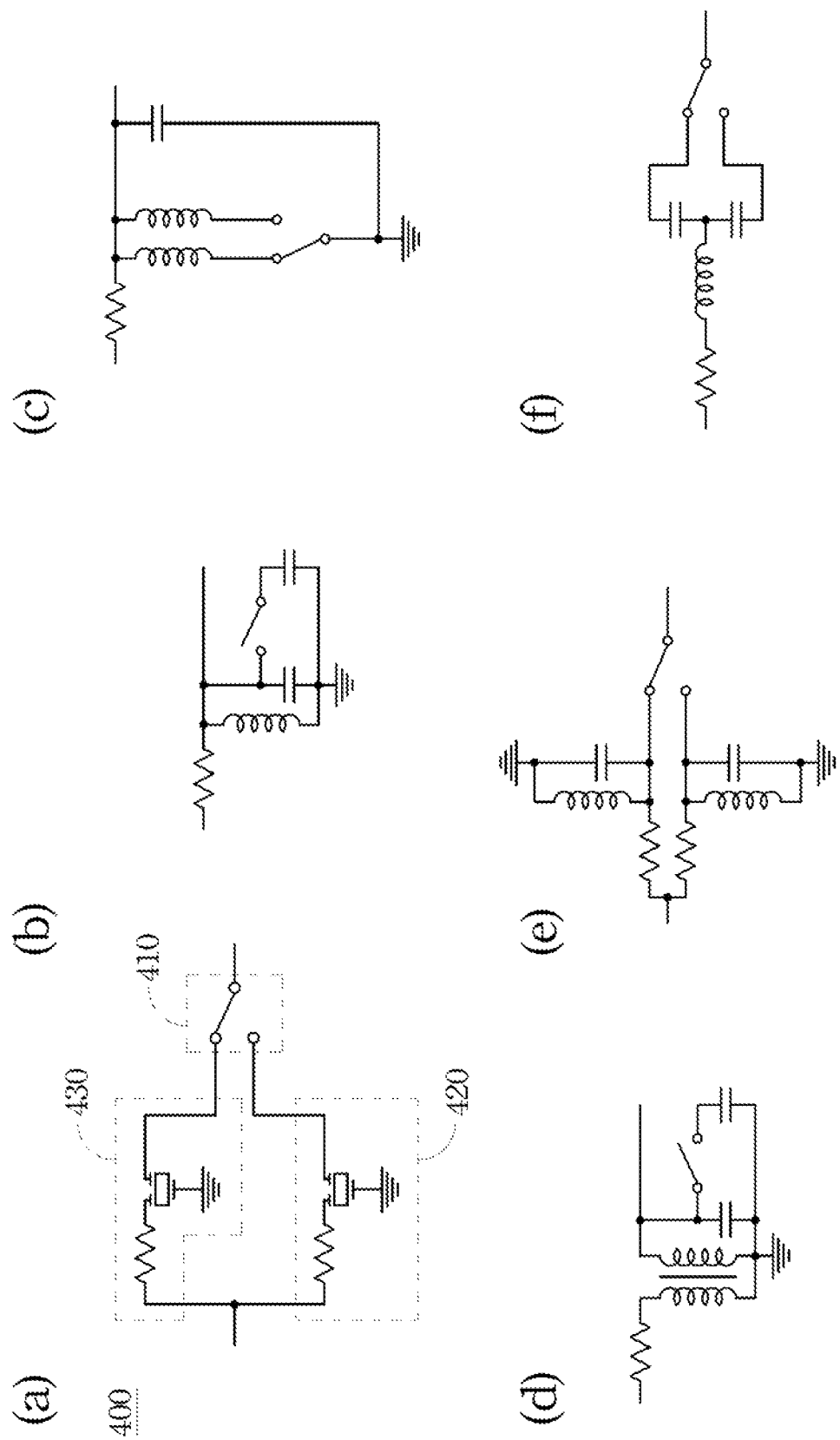
FIG. 4 is a schematic diagram of circuits of the filter module.

Moreover, the band pass filter, resonator, and demodulator could be designed with a variety of circuits. Please refer to FIG. 4. FIG. 4 is a schematic diagram of filter modules of the embodiment. The band pass filters comprise the band pass filters and the selectors. A band pass filter is a device that passes signals with carrier frequencies within a certain range and rejects signals with carrier frequencies outside that range. The band pass filter is usually designed with resistors, capacitors and inductors, or ceramic devices. The FIG. 4(a) is the filter module 400 with two kinds of band pass filters 420, 430. When the selector 410 selects the upper band pass filter 430, the single channel signal filtered by the band pass filter 430 is picked to output. Similarly, the FIG. 4(b) to (f) are other embodiments of the filter modules composed of plurality of resistors, capacitors or inductors, along with a selector to pick which single channel signal to output. The structures of the filter module in the FIG. 4(b) to (f) are pretty similar to the structure in FIG. 4(a) therefore will not be further described herein.

Figure 5:
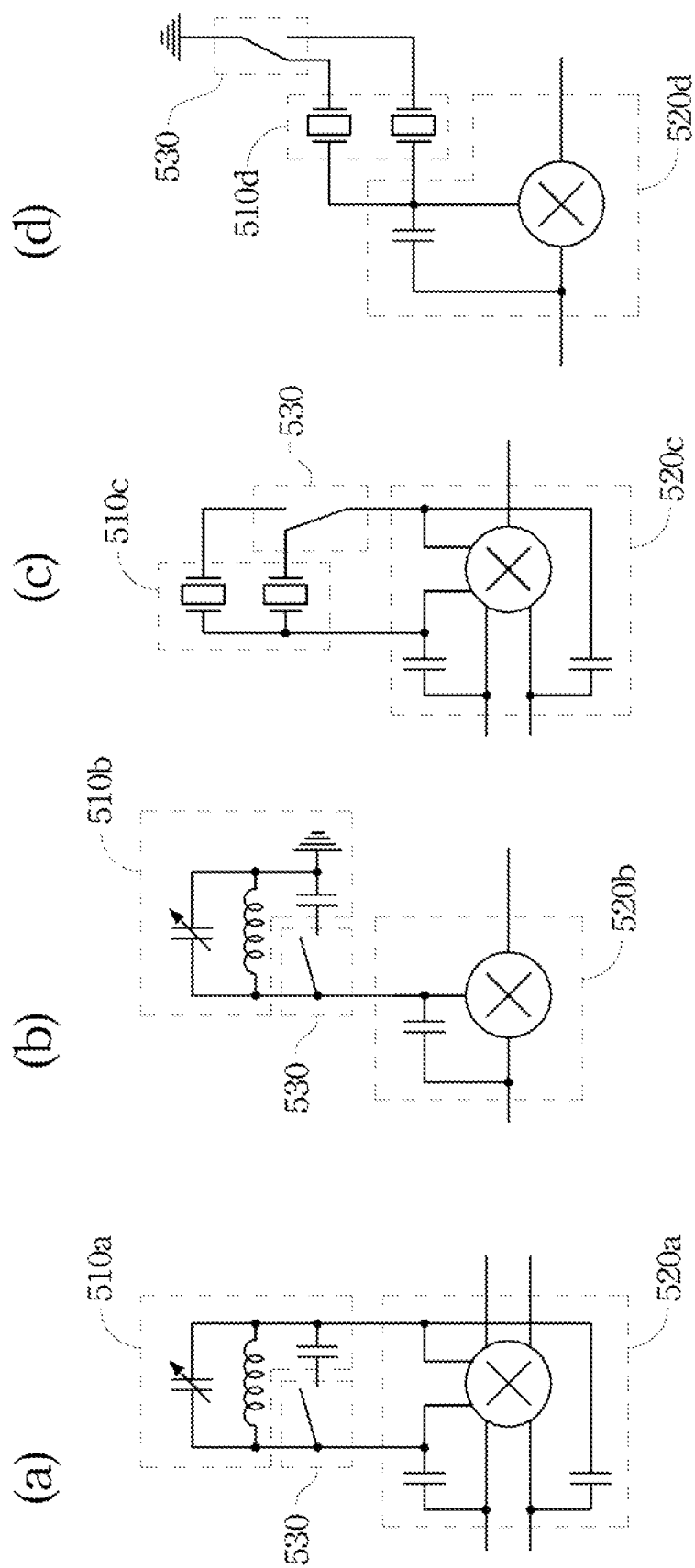
FIG. 5 is a schematic diagram of circuits of the resonator and the demodulator.

In FIG. 5 are some embodiments of circuit diagrams of the resonator and the demodulator. In FIG. 5(a) to (d), the selector 530 is used to change the capacitance (for example 510a, 510b) or select different resonators (for example 510c, 510d) to adjust resonance frequency. The demodulators (for example demodulator 520a, 520b, 520c, 520d) may be designed with at least a mixer along with capacitors. The structures of the resonator and the demodulator in the FIG. 5(a) to (f) are similar to the structure in FIG. 5(a) therefore will not be further described herein.

In FIG. 6 are some schematic diagrams of a selector. The single terminal selectors are shown in FIGS. 6(a) and (b), and can be made with a transistor or two different kinds of transistors to accomplish the on/off state function. The double terminals selector is shown in FIG. 6(c). The double terminals selector can use different gate voltages applied on two transistors to accomplish the select function.

In all embodiments of the present invention, the plurality of band pass filters and corresponding resonators are configured in the circuit. Two selectors and a band control module are also configured in the circuit. Therefore, the present invention illustrates one circuit device that can receive and process multi-channel signal. When the first selector is coupled to the specific band pass filter, and outputs the selected single channel signal, the second selector is switched to the corresponding resonator to demodulate the selected single channel signal. Moreover, an infrared multi-channel receiver is also provided in the specification to interpret the application field and the advantage.

To further utilize the correspondence between band pass filters (316a, 316b, 316c, 316d) and resonators (324a, 324b, 324c, 324d), one way in designing the infrared multi-channel receiver is to use the infrared multi-channel receiver to process multi-channel signal comprising multiple single channel signals. In such infrared multi-channel receiver each band pass filter is designed for filtering the multi-channel signal and outputting one single channel signal carried by one specific frequency. In this infrared multi-channel receiver each resonator is also designed for working with the demodulator to demodulate one single channel signal carried by one specific frequency. When one resonator corresponds to one band pass filter it means both two are designed to process a specific single channel signal.

For example, assuming infrared multi-channel receiver 300 in FIG. 3 is used to receive a multi-channel signal comprising two audio sources, each source comprising left sound channel and right sound channel respectively. The 1st audio source may have left sound channel signal carried by 3.2 MHz frequency, and right sound channel signal carried by 2.3 MHz frequency. The 2nd audio source may have left sound channel signal carried by 3.8 MHz frequency, and right sound channel signal carried by 2.8 MHz frequency. In this application, the four band pass filters 316a, 316b, 316c and 316d are designed to filter the multi-channel signal and allowing single channel signal carried by 2.3 MHz, 2.8 MHz, 3.2 MHz and 3.8 MHz respectively to pass.

Furthermore, the resonators 324a, 324b, 324c and 324d are also designed to work with demodulators 326a and 326b to demodulate single channel signal carried by 2.3 MHz, 2.8 MHz, 3.2 MHz and 3.8 MHz respectively.

When the band control module 334 controls the selector 318a to couple with band pass filter 316a and selector 318b to couple with band pass filter 316c, the left sound channel signal carrier of 1st audio source will be outputted by filter 316c (3.2 MHz) along with right sound channel signal carrier of 1st audio source outputted by filter 316a (2.3 MHz). These two signals will be sent to limiting amplifiers 320 to be amplified.

The band control module 334 will also control the selector 328a to couple with resonator 324a and selector 328b to couple with resonator 324c. The left sound channel signal carrier of 1st audio source will then be demodulated by resonator 324c (3.2 MHz) and demodulator 326b, while the right sound channel signal carrier of 1st audio source be demodulated by resonator 324a (2.3 MHz) and demodulator 326a. These two demodulated single channel signals will then be processed and outputted by filters 330 and amplifiers 332, so a complete set of left/right channel signal of 1st audio source are extracted from a multi-channel signal and processed for users to listen.

If now the band control module 334 controls the selector 318a to couple with band pass filter 316b and selector 318b to couple with band pass filter 316d, also controls the selector 328a to couple with resonator 324b and selector 328b to couple with resonator 324d. The left sound channel signal carrier of 2nd audio source will be outputted by filter 316d (3.8 MHz) along with right sound channel signal carrier of 2nd audio source outputted by filter 316b (2.8 MHz). These two single channel signals carrier of 2nd audio source will then be demodulated separately by resonator 324d (3.8 MHz) and demodulator 326b collectively, and resonator 324b (2.8 MHz) and demodulator 326a collectively. The demodulated single channel signals will then be processed and outputted by filters 330 and amplifiers 332, so a complete set of left/right channel signal of 2nd audio source are extracted from a multi-channel signal and processed for users to listen. Therefore, the multi-channel receiver 300 can receive and process a multi-channel signal carrying more than one audio source, and process the multi-channel signal to output one complete set of audio signals comprising left sound channel and right sound channel upon user's selection.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A signal processing device comprising:
   a filter module for receiving a multi-channel signal comprising:
      at least two band pass filters configured for filtering the multi-channel signal and outputting a single channel signal respectively;
      a first selector selectively coupled to one of the band pass filter to output the selected single channel signal;
   a demodulation module coupled to the filter module, configured for demodulating the selected single channel signal and outputting a demodulated signal, the demodulation module further comprising:
      a demodulator;
      at least two resonators corresponding to the band pass filters;
      a second selector configured between the demodulator and the resonators configured for selectively coupling the demodulator with the resonators; and
   a band control module coupled to the first selector and the second selector configured for controlling the coupling of the first selector and the band pass filters and the corresponding coupling of the demodulator and the resonators by the second selector.

2. The device of claim 1 wherein the device further comprises an amplifier, coupled to the filter module, configured for amplifying the multi-channel signal.

3. The device of claim 1 wherein the device further comprises a limiting amplifier, arranged between the filter module and the demodulation module, and configured for amplifying amplitude of the single channel signal.

4. The device of claim 1 wherein the device further comprises a filter, coupled to the demodulation module, configured for filtering the demodulated signal.

5. The device of claim 1 wherein the device further comprises a baseband amplifier, coupled to the demodulation module, configured for amplifying the demodulated signal.

6. An infrared multi-channel receiver comprising:
   an optical sensor configured for transducing an infrared multi-channel signal to an electrical multi-channel signal;
   a filter module, coupled to the optical sensor, further comprising:
      at least two band pass filters, coupled to the optical sensor, configured for filtering the multi-channel signal into plurality of single channel signals;
      a first selector, selectively coupled to one of the band pass filters, configured for outputting a selected single channel signal;
   an amplifier, coupled to the filter module, configured for amplifying the selected single channel signal;
   a demodulation module, coupled to the amplifier, configured for outputting a demodulated signal, further comprising:
      a demodulator;
      at least two resonators corresponding to the band pass filters; and
      a second selector selecting one of the resonators to couple to the demodulator;
   a band control module coupled to the first selector and the second selector and configured for controlling the coupling of the first selector and the band pass filters and the corresponding coupling of the demodulator and the resonators by the second selector.

7. The receiver of claim 6 further comprising an amplifier, arranged between the optical sensor and the filter module, configured for amplifying the electrical multi-channel signal.

8. The receiver of claim 6 further comprising a filter, coupled to the demodulation module, configured for filtering the demodulated signal.

9. The receiver of claim 6 further comprising a baseband amplifier, coupled to the demodulation module, configured for amplifying the demodulated signal.

10. The receiver of claim 6 wherein the amplifier coupled to the filter module further configured for generating a received signal strength indicator signal.

11. The receiver of claim 10 further comprising a mute module, coupled to the amplifier, configured for comparing the received signal strength indicator signal with a threshold level and turning off the baseband amplifier when the received signal strength indicator signal is lower than the threshold level.

12. The receiver of claim 11 wherein the mute module also sending out a turn off signal when turning off the baseband amplifier.

13. The receiver of claim 6 further comprising a power management block coupled to the mute module wherein the power management block comprises:
- a power management module;
- a bias module, coupled to the power management module, configured for biasing the infrared multi-channel receiver; and
- a power switch, coupled to the power management module, configured for sending a first trigger signal to the power management module to control the on/off state of the bias module.

* * * * *